United States Patent [19]

Montalvo, Sr.

[11] 4,175,651
[45] Nov. 27, 1979

[54] AIR/MERCURY ACTUATION OF BRAKES AND CLUTCHES

[76] Inventor: Edwin J. Montalvo, Sr., 1375 Forest Ave., Portland, Me. 04103

[21] Appl. No.: 782,234

[22] Filed: Mar. 28, 1977

[51] Int. Cl.² ............................................. F16D 25/04
[52] U.S. Cl. .............................. 192/85 AB; 192/88 A; 188/71.4
[58] Field of Search ............ 192/85 AB, 88 A, 105 A; 188/71.3, 72.4, 71.4, 368, 369, 370; 92/98 D, 97, 117 A; 60/671

[56] References Cited

U.S. PATENT DOCUMENTS

| 771,771 | 10/1904 | Dysterud | 192/105 A |
|---|---|---|---|
| 2,210,416 | 8/1940 | Kiep et al. | 192/105 A |
| 2,333,682 | 11/1943 | Schneider | 192/85 AB |
| 2,351,876 | 6/1944 | Peterson | 192/85 AB |
| 2,538,997 | 1/1951 | Weiland | 192/85 AT |
| 2,555,772 | 6/1951 | Wickwire | 192/105 A |
| 2,744,385 | 5/1956 | Hohenner | 60/326 |
| 2,961,831 | 11/1960 | Brueder | 188/370 |
| 3,092,228 | 6/1963 | Deykin | 192/85 AB |
| 3,237,738 | 3/1966 | Suppes | 192/88 A |
| 3,295,647 | 1/1967 | Murphy | 192/85 AA |
| 3,391,644 | 7/1968 | Taplin | 92/97 |
| 3,410,779 | 11/1968 | Whitehead | 92/98 D |
| 4,006,669 | 2/1977 | Price | 188/72.4 |

Primary Examiner—Benjamin Wyche
Attorney, Agent, or Firm—Brooks, Haidt, Haffner & Delahunty

[57] ABSTRACT

Because of its physical properties, mercury can be very effective as hydraulic fluid in a double-action piston and cylinder assembly mounted to float between opposed discs of a friction brake or clutch. The mercury is contained within a chamber of the piston-cylinder assembly and the high surface tension of the fluid prevents leakage.

20 Claims, 7 Drawing Figures

AIR/MERCURY ACTUATION OF BRAKES AND CLUTCHES

BACKGROUND OF THE INVENTION

1. Field of the Invention

The present invention relates to friction coupling mechanisms such as brakes wherein a rotatable element is frictionally coupled to a relatively nonrotatable element and clutches wherein two relatively rotatable elements are coupled and uncoupled. More particularly the invention relates to friction coupling mechanisms wherein mercury is employed as hydraulic fluid in a force multiplying piston and cylinder assembly.

2. Description of the Prior Art

Hydraulic and hydraulic-pneumatic brakes and clutches having friction members driven outwardly in opposite directions to engage opposed discs have been described in Suppes et al, U.S. Pat. Nos. 3,237,738 and 3,311,205 and 3,584,717, as well as in Montalvo U.S. Pat. No. 3,696,900. The devices disclosed in those patents are compact and easy to service. The present invention incorporates advantageous features shown in the above identified patents.

The high density of mercury has suggested its use as a damping medium in a clutch, as in U.S. Pat. No. 771,771, or as the fluid in a centrifugal clutch. The use of mercury as a coolant in a slip clutch has been suggested in U.S. Pat. No. 3,695,407.

Despite the wide variety of prior art clutches and brakes, there continues to be a need for improved friction coupling mechanisms that combine compactness with high torque capability, especially for industrial applications where space is limited.

SUMMARY OF THE INVENTION

The friction brake or clutch of this invention incorporates a force multipying piston and cylinder assembly using as hydraulic fluid a liquid which does not seep out around the piston even when very high static pressure is applied. Mercury is a presently preferred hydraulic fluid, having high surface tension which prevents seepage even when great static pressure acts continuously on the mercury in an enclosed chamber, but some other liquid having similar resistance to seepage might be employed. In a preferred embodiment of the invention there are a plurality of piston-cylinder assemblies arranged to "float" for double-acting axial extension to engage opposed plates which can be considered as discs. Each double-acting piston-cylinder assembly constitutes a separate generally cylindrical module slidingly fitted into one of a plurality of equally arcuately spaced bores of a body for exertion of equal pressure by friction shoes or pads at opposite ends of the module against the discs when the clutch or brake is engaged.

Although a presently preferred embodiment of the invention in the form of a clutch is described in detail it will be understood that the principles and structure of the invention are contemplated to have wide applicability to other uses where conventional pneumatic or hydraulic-pneumatic devices are now employed as linear actuators.

The piston-cylinder assembly shown has a diaphragm-type piston guided for axial movement within the module under pneumatic pressure to exert force on seepage resistant hydraulic fluid, such as mercury, or other liquid having similar physical properties to resist seepage, in a chamber for extension of a working piston carrying a friction shoe. Equal and opposite force is exerted by another friction shoe carried by the end of the module opposite to the outer face of the working piston.

When, as is preferred in brakes or clutches incorporating the piston and cylinder assembly of the invention, a plurality of modules are employed, each can be individually controlled by control of the air supply, if desired. The mounting arrangement for a brake or clutch is so structured as to facilitate access for inspection, maintenance or replacement of working parts. These and other applications, objects and advantages of the invention will be more fully understood from the following detailed description of a preferred embodiment of the invention, especially when that description is read in conjunction with the accompanying drawing figures illustrating a clutch according to the invention.

BRIEF DESCRIPTION OF THE DRAWING

In the accompanying drawing, in which like reference characters indicate like parts throughout.

DETAILED DESCRIPTION OF PREFERRED EMBODIMENT

Figure 1:
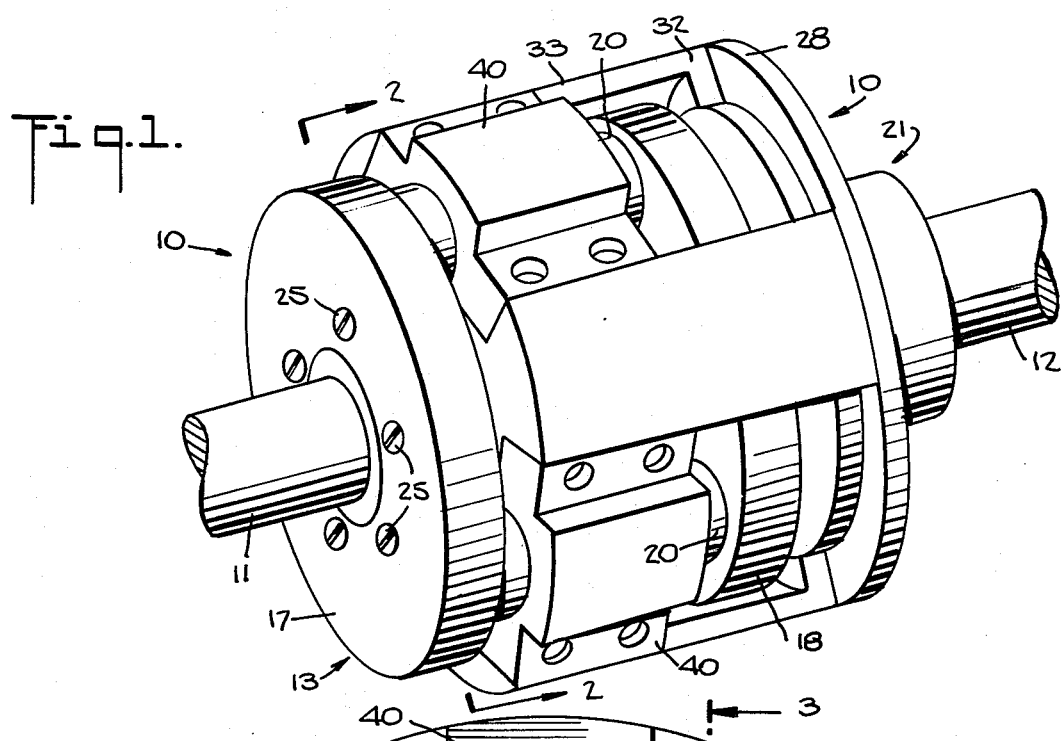
FIG. 1 is an overall view in perspective of a clutch embodying air/mercury actuation according to the invention.

The clutch generally designated by reference numeral 10 in the drawing is of the type used for selectively transmitting rotational motion from a driving element, shown as a shaft 11, to a driven element, shown as a shaft 12 which has its axis aligned with the axis of the shaft 11. It will be understood that if the output or driven element were replaced by a fixed element the device shown would function as a brake.

Figure 3:
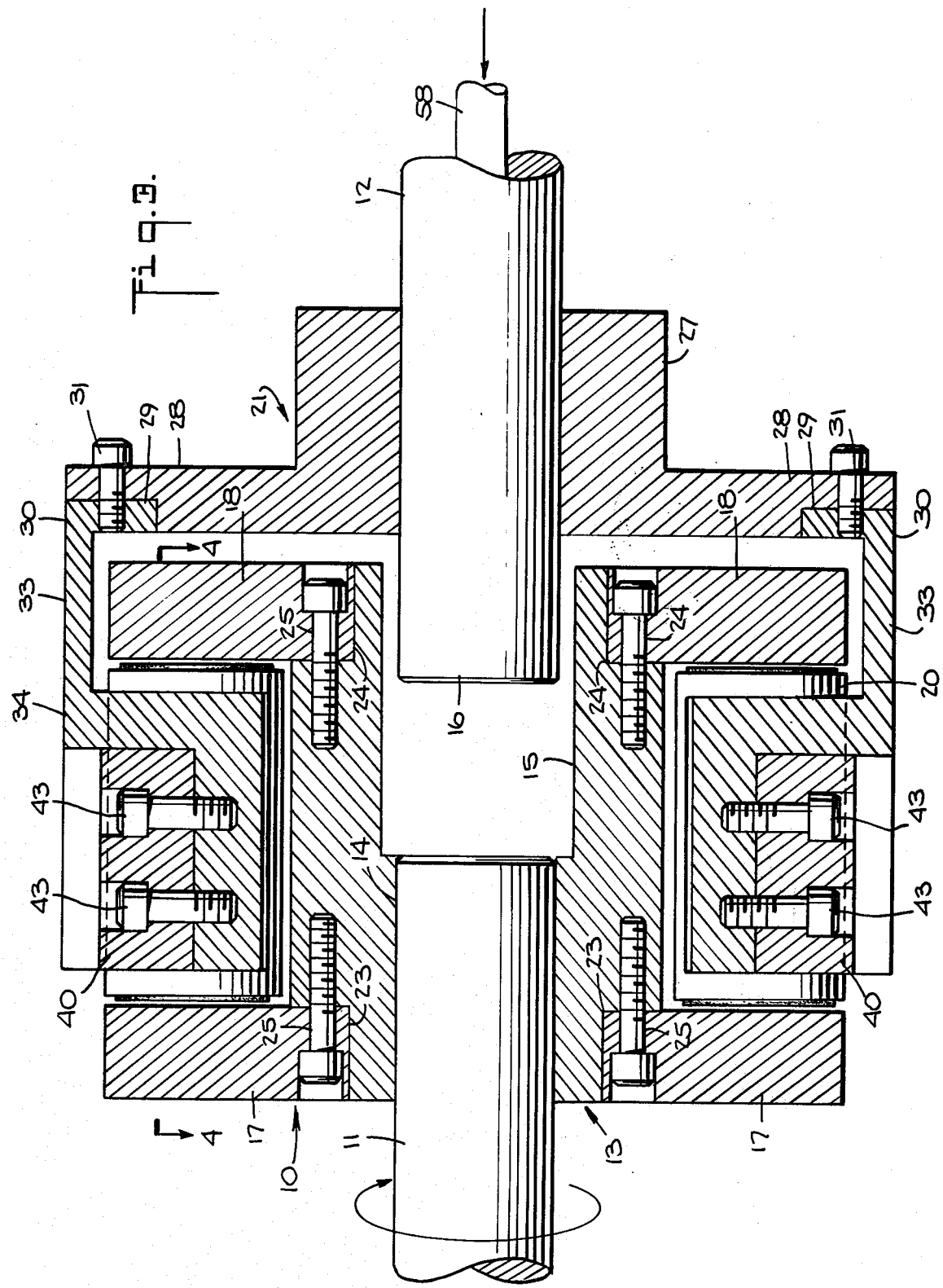
FIG. 3 is a view in section taken along line 3—3 of FIG. 2.
Figure 5:
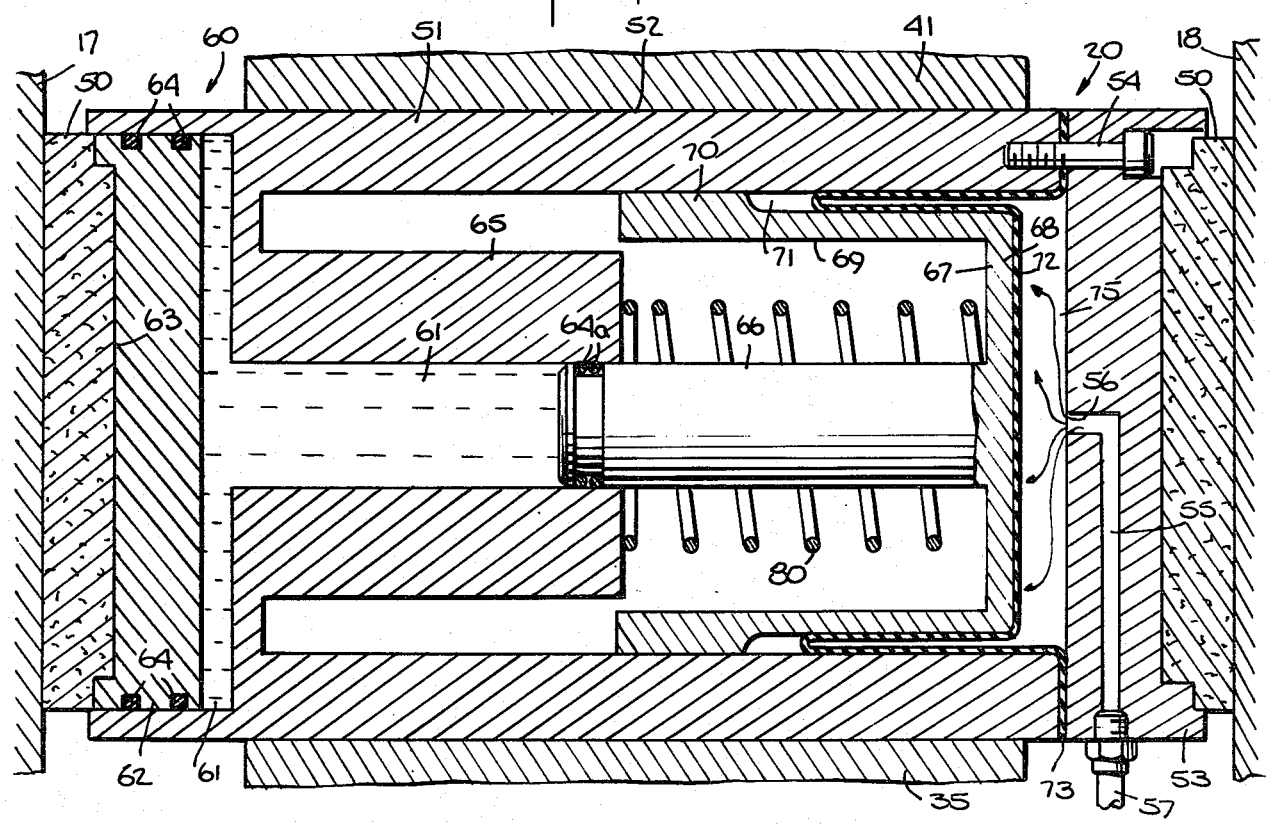
FIG. 5 is a view similar to FIG. 3 showing the clutch in engaged condition.

The reference numeral 13 in the drawings generally designates a rotor body affixed to the driving shaft 11 for rotation therewith. As best shown in FIGS. 3 and 5, the rotor body 13 is generally cylindrical, with a central axial bore at 14 tightly fitted on the shaft 11, which bore widens at 15 to surround the end 16 of the output shaft 12 which is freely rotatable within the axial space at 15 where the rotor body 13 extends beyond the end of the driving shaft 11. Mounted on the rotor body 13, at opposite ends thereof, are a pair of flat ring-shaped plate members 17 and 18 which extend radially outward. The plate members 17 and 18, which rotate with the drive shaft 11 can be considered as a pair of opposed, parallel discs for engagement by double-acting outwardly extensible piston and cylinder assemblies generally designated 20 mounted between the plates 17 and 18 and arranged parallel to the axes of the shafts 11 and 12. These piston and cylinder assemblies are mounted on a piston carrier 21 secured to the output shaft 12 for rotation therewith. When the piston and cylinder assemblies 20 are in their extended condition the rotor 13 is coupled to the piston carrier 21 and the output shaft 12 is driven to rotate with the drive shaft 11 as shown in FIG. 5.

Attention is directed to the preferred manner of assembling the elements just described as shown in FIGS. 3 and 5. It will be seen that the rotor body 13 has annular steps 23 and 24 at its opposite ends for reception of the ring-like plates 17 and 18 which are secured to the rotor body 13 by a plurality of screws 25, the heads of which are preferably recessed as shown. The rotor body 13 and radially extending elements 17 and 18 could also be of unitary construction.

Figure 2:
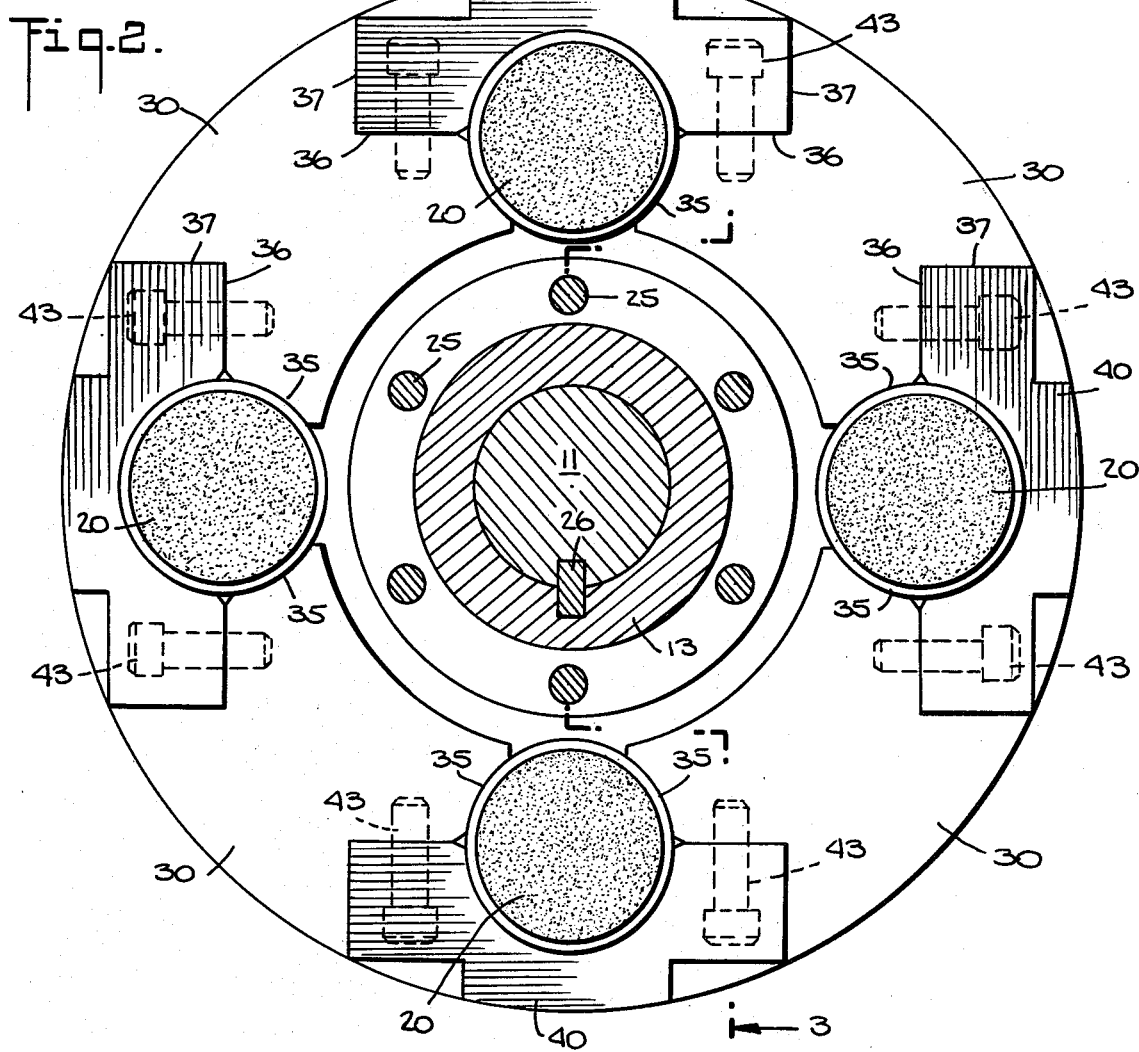
FIG. 2 is a section view of the clutch of FIG. 1 taken along line 2—2 of FIG. 1 and looking in the direction of the arrows, with concealed parts indicated by dashed lines.

FIG. 2 shows that the rotor body 13 is keyed to the shaft 11 by a member 26.

The piston carrier 21 is keyed to the output shaft 12 and comprises an annular collar 27 with a radially extending peripheral flange 28. The flange 28 has an annular step area at 29 facing inwardly and a plurality of legs 30 mounted at the area 29 are secured to the flange 28 by screws 31 as shown in FIGS. 3 and 5. The legs 30 extend parallel to the axes of the shafts 11 and 12 for mounting of the piston and cylinder assemblies 20 upon and between adjacent legs 30. In the embodiment illustrated there are four piston and cylinder assemblies 20 and four legs 30 equally arcuately spaced about the shaft axes, but some other number could be provided.

Figure 7:
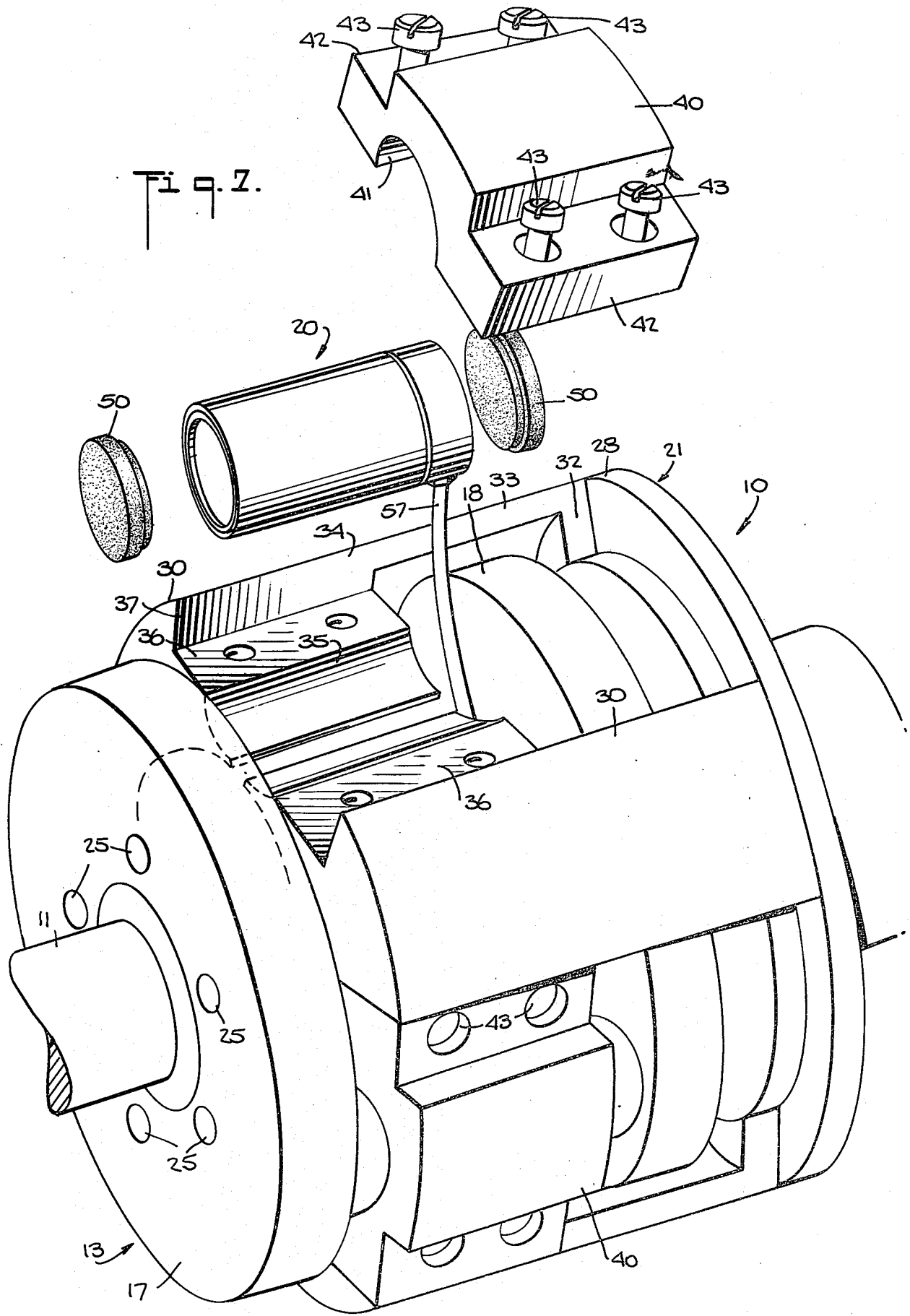
FIG. 7 is a partially exploded view of the clutch of FIG. 1 showing the manner of assembly of parts for easy service.

FIGS. 1, 2 and 7 show that the legs 30 have foot portions 32, arcuate in shape and attached to the flange 28, an intermediate portion 33 formed as a segment of a cylinder extending past the plate 18 and leaving clearance for rotation of the plate 18, and a cylinder assembly mounting portion 34 that is shaped somewhat like the letter X in profile when viewed along a line parallel to the axis of rotation of the shaft 11.

The sectional view of FIG. 2 illustrates how the legs 30 receive the piston and cylinder assemblies 20 between arcuately curved areas 35 of the mounting pistons 34 of adjacent legs 30, and the partially disassembled view of FIG. 7 can be compared with FIG. 2 to see how the parts 20 and 30 interfit. Radially outward of the curved areas 35, both longitudinal sides of the mounting portion 34 of each leg 30 are formed with a generally rectangular step having a flat base 36 and a flat wall 37, and the opposed stepped areas of adjacent legs 30 constitute a generally rectangular mounting space for demountable cap or cover members 40 which fit over the piston and cylinder assemblies 20. The cap 40 removed in FIG. 7 can be seen to have a curved interior area at 41 for embracing the piston and cylinder assembly 20 and a pair of wings 42 which in assembled condition, overlie the base areas 36 of the leg portions 34 and are secured thereto by pairs of screws 43 which fit into threaded bores of the leg portion 34 to secure the piston and cylinder assemblies 20 in place while permitting easy access to the assemblies 20 for inspection and maintenance, as shown in FIG. 7.

The friction coupling assembly described can, of course, be used with any of various kinds of double acting piston and cylinder assemblies, whether hydraulic, pneumatic or hydraulic-pneumatic, and will provide the advantages of quick servicing of working parts. However, the structure described is particularly advantageous when used in connection with air/mercury piston and cylinder capsules according to the present invention as shown in detail in FIGS. 4 and 6.

Figure 4:
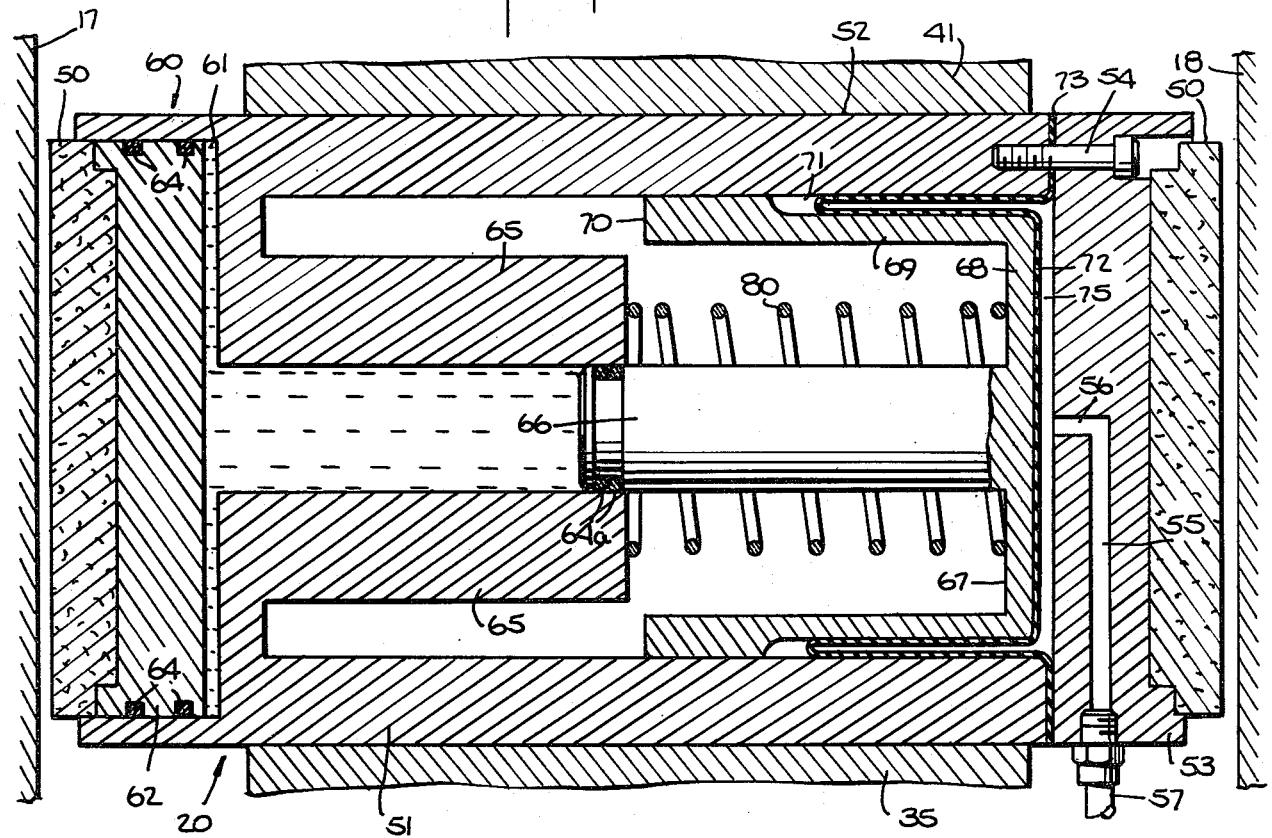
FIG. 4 is a detail view in section of a piston-cylinder module in retracted condition, taken along line 4—4 of FIG. 3.
Figure 6:
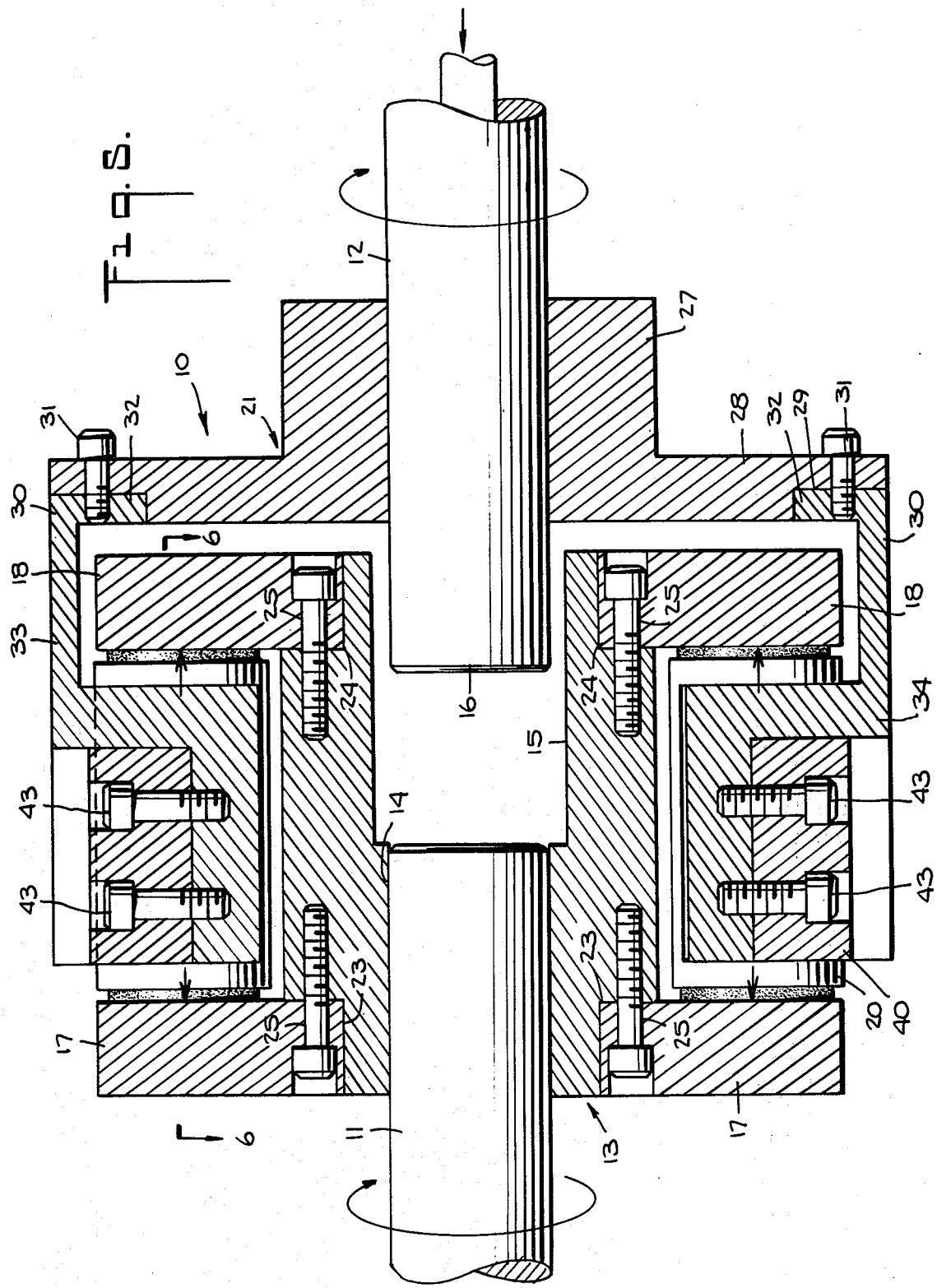
FIG. 6 is a view taken along line 6—6 of FIG. 5 and showing the piston-cylinder module in extended condition.

It will be seen from the various drawing figures that the piston and cylinder assembly 20 is mounted as a "floating" capsule, embraced between the curved areas 35 and 41 but not secured thereto, so the entire capsule assembly 20 can move in either direction parallel to the axis of rotation of the shaft 11. The bearing surfaces 35 and 41 and the capsule 20 itself are machined for easy sliding motion. As shown in FIGS. 4 and 6 both ends of the piston and cylinder capsule assembly carry friction shoes or pads for frictional engagement with the plates 17 and 18 when the clutch is engaged as in FIG. 6. The free floating mounting of the capsule 20 causes the friction shoes 50 to exert equal pressure on both discs 17 and 18.

The capsule assembly 20 has been called double-acting in this description in that both ends carrying the shoes 50 move outward upon actuation and inward upon return. The assembly 20 has a housing 51 with a cylindrical outer wall 52. At one end, the housing 51 is closed by a cover 53 secured to the housing 51 by a plurality of bolts 54, one of which is shown. The cover has a central recess for the friction shoe 50 which can be of an asbestos composition or the like, and a passageway 55 is provided through the cover, opening through the center of the cover at 56 for supplying air to the interior of the housing 51. As shown in FIGS. 4, 6 and 7, a flexible air hose 57 feeds air under pressure to the capsule 20, and the hose 57 is preferably secured by a threaded fitting 58 at an opening of the passageway 55 at the periphery of the cover 53. Reverting to FIG. 3, it will be seen that the main supply line 58 for bringing air under pressure to all of the piston and cylinder capsule assemblies can be a passage through the shaft 12, ultimately connected to a plant air supply, which may typically provide sixty pounds per square inch gauge pressure.

At the housing end 60 opposite from the cover 53 there is a central chamber 61 slidably enclosing a flat, disc-shaped working piston 62 which carries a friction shoe 50 in a recess in the piston face 63. Seal means in the form of a pair of elastomeric O-ring seals 64 are shown fitted in annular grooves encircling the piston 62 to assure against leakage from the chamber 61 of the fluid under high pressure therein.

To the rear of the piston 62, the chamber 61 extends inwardly of the housing 51 within a wall 65 formed by an inward returning portion of the housing. The wall 65 can be integrally formed with the housing 51 as shown, and constitutes a cylinder coaxial with and spaced within the cylindrical outer wall 52 of the housing 51. Closely yet slidably fitted within the cylindrical area of the chamber 61 defined by the wall 65 there is a piston rod 66. Seal means in the form of a pair of elastomer O-ring seals 64a are shown fitted in annular grooves encircling the piston rod 66 to assure against leakage from the chamber 61. Movement of the piston rod 66 toward the working piston 62 moves the piston 62 through force transmitted hydraulically through the fluid medium in the chamber 61.

It has been found that mercury is a highly effective hydraulic medium for use in a piston and cylinder assembly because the high surface tension of mercury prevents leakage or seepage even when the great static pressure is applied to the mercury. Some other liquid having similar seepage resistance could also be employed in the mechanism of the invention. In the present invention, as will be seen, the capsule assembly 20 acts as a force multiplier with a high ratio of force multiplication, and it is necessary to avoid the chance of leakage of the hydraulic fluid, and that is done by using mercury as the fluid, as well as by the provision of the sealing rings 64.

The internal piston rod 66 has a generally cup-shaped head 67 including a face portion 68 in spaced, opposed relationship to the inner side of the cover 53 and a wall portion 69 extending inwardly and coaxially with the rod 66, a lip portion 70 of the wall 69 is closely yet slidably fitted within the housing wall 52, serving to guide the piston stroke, but along most of its length the wall 69 is spaced from the housing wall 52 by an annular space 71.

The internal piston with the cup-shaped head 67 is shown as being of the rolling diaphragm type, the diaphragm 72 being mounted at its peripheral area 73 between the cover 53 and the housing wall 52. A rolling diaphragm like diaphragm 72 provides a relatively long stroke. It will be seen that the diaphragm 72 has a full 180 degree convolution at 74 between the diaphragm edge 73 and its central area overlying the piston head 68. During motion of the piston head 68, the diaphragm 72 rolls along the walls defining the annular space 71, as shown by the comparison of FIGS. 4 and 6.

The chamber 75 enclosed between the diaphragm 72 and the cover 53 is not under such high pressure as the mercury in the chamber 61, because of the force multiplying effect of the compound piston arrangement, the piston 62 moving through substantially shorter stroke than the piston rod 66.

The friction shoes 50 are spaced close to the friction plates 17 and 18 as shown in FIG. 4, so that engagement of the clutch requires only a very short stroke. This allows the use of the air to mercury force intensification according to the invention. Using air under relatively low pressure, such as manufacturing plant pressurized air at 60 p.s.i.g. permits easy direction and actuation control through air valves which are generally less expensive than hydraulic valves. Pressure can be regulated through an air pressure regulator valve.

The mercury in the chamber 61 does not circulate, but can be considered a substantially static body, so little heating is generated by clutch movements to engage and disengage. The booster effect allows great force to be exerted by a relatively compact unit.

The intensification of force achieved is an application of Pascal's principle that an increase in pressure at any point in a liquid that completely fills its container results in a like increase at every other part of the liquid. When a given force is exerted on the piston rod 66, which has a relatively small area, the force exerted by the large portion 62 is equal to the force on the rod 66 multiplied by the ratio of the large piston area to the small rod area. Thus a great force acting through a short distance is obtained by exerting a relatively small force. Since, as illustrated in the drawings the ratio of piston areas is large and great force intensification occurs and the pressure on the fluid in chamber 61 is very high, making it desirable to use a high surface tension fluid like mercury rather than water or oil.

It will also be seen that a coiled spring 80, positioned around the rod 66 and secured to the piston head 68 and internal cylinder wall 65, serves as a return spring for the assembly 20 when the air under pressure in the chamber 75 is discharged to disengage the clutch. The retraction spring 80 under tension as shown need not be very powerful since it meets no resistance upon discharge except the inertia of the assembly elements.

While a preferred embodiment of the invention has been shown and described, various modifications, changes in size and shape of parts, etc., will suggest themselves to those familiar with the art, and such changes are considered to be within the spirit and scope of the invention.

What is claimed is:

1. A mechanism for selectively frictionally coupling two relatively rotatable bodies comprising two parallel friction plates connected to a first one of said bodies transverse to the axis of rotation of said first body, the second of said bodies carrying an expandable piston and cylinder means mounted between said friction plates for engagement of friction members carried by said piston and cylinder means with said friction plates upon expansion of said piston and cylinder means, said piston and cylinder means being mounted to float in a cylinder carrying member on said second body for applying equal force against both said friction plates upon expansion of said piston and cylinder means, said piston and cylinder means having a seepage resistant hydraulic medium within a cylinder chamber.

2. The mechanism of claim 1 wherein the seepage resistant hydraulic medium is mercury.

3. The mechanism of claim 1 wherein said first body comprises a rotatable drive shaft and said second body comprises a rotatable output shaft aligned with said drive shaft, whereby the mechanism operates as a clutch.

4. A mechanism for selectively frictionally coupling two relatively rotatable bodies comprising two parallel friction plates connected to a first one of said bodies transverse to the axis of rotation of said first body, the second of said bodies carrying an expandable piston and cylinder means mounted between said friction plates for engagement of friction members carried by said piston and cylinder means with said friction plates upon expansion of said piston and cylinder means, wherein said piston and cylinder means are mounted for sliding movement parallel to the axis of rotation of the first body between a cylinder carrier member secured to said second body and a removable cylinder cap, said piston and cylinder means having a seepage resistant hydraulic medium within a cylinder chamber.

5. The mechanism of claim 4 wherein the seepage resistant hydraulic medium is mercury.

6. The mechanism of claim 4 wherein said first body comprises a rotatable drive shaft and said second body comprises a rotatable output shaft aligned with said drive shaft, whereby the mechanism operates as a clutch.

7. A mechanism for selectively frictionally coupling two relatively rotatable bodies comprising two parallel friction plates connected to a first one of said bodies transverse to the axis of rotation of said first body, the second of said bodies carrying an expandable piston and cylinder means mounted between said friction plates for engagement of friction members carried by said piston and cylinder means with said friction plates upon expansion of said piston and cylinder means, wherein said piston and cylinder means comprise a plurality of piston and cylinder assemblies equally arcuately spaced around and arranged parallel to the axis of rotation of said first body, said piston and cylinder assemblies each having a seepage resistant hydraulic medium within a cylinder chamber.

8. The mechanism of claim 7 wherein there are four piston and cylinder assemblies.

9. The mechanism of claim 7 wherein the seepage resistant hydraulic medium is mercury.

10. The mechanism of claim 7 wherein said first body comprises a rotatable drive shaft and said second body comprises a rotatable output shaft aligned with said drive shaft, whereby the mechanism operates as a clutch.

11. A force intensifying piston and cylinder assembly comprising a first piston and a second piston and a body of seepage resistant liquid in an enclosed chamber between said first and second pistons, said first piston having an area in contact with said body of seepage resistant liquid which is substantially larger than the area of said second piston in contact with said body of seepage resistant liquid, and means for moving said second piston toward said first piston to transmit force through said seepage resistant liquid from said second piston to said first piston, said force being intensified by an amount equal to the ratio of said piston areas in contact with said body of seepage resistant liquid, said second piston and cylinder assembly having a piston rod portion movable within a cylindrical wall forming part of the chamber enclosing said body of seepage resistant liquid, and said second piston having a piston head slidable in an air chamber selectively supplied with air under pressure to actuate movement of said second piston toward said first piston.

12. The assembly of claim 11 wherein the piston head of said second piston is generally cup-shaped and is in contact with a rolling diaphragm having a flat central area and a convolution in rolling contact with a lip area of said diaphragm being secured in place by a cover of said air chamber.

13. The assembly of claim 12 wherein the seepage resistant liquid is mercury.

14. The assembly of claim 11 wherein said seepage resistant liquid is mercury.

15. A force intensifying piston and cylinder assembly comprising a first piston and a second piston and a body of seepage resistant liquid in an enclosed chamber between said first and second pistons, said first piston having an area in contact with said body of seepage resistant liquid which is substantially larger than the area of said second piston in contact with said body of seepage resistant liquid, and means for moving said second piston toward said first piston to transmit force through said seepage resistant liquid from said second piston to said first piston, said force being intensified by an amount equal to the ratio of said piston areas in contact with said body of seepage resistant liquid, said first piston being generally disc-shaped, and including a pad of friction material mounted on a face of said first piston in contact with said body of seepage resistant liquid.

16. The assembly of claim 15 wherein the seepage resistant liquid is mercury.

17. In a friction coupling mechanism of the type wherein pairs of friction elements are mounted to move outwardly in mutually opposite directions for engagement with opposed surfaces of two parallel plates carried by a member which is relatively rotatable with respect to said friction coupling member, the improvement comprising a pneumatically actuated force intensifying piston and cylinder assembly wherein a seepage resistant hydraulic liquid serves as the means for moving said friction elements outwardly.

18. Apparatus according to claim 17 wherein there are four of said piston and cylinder assemblies carrying eight of said friction elements in pairs mounted at opposite ends of the piston and cylinder assemblies.

19. Apparatus according to claim 17 wherein the piston and cylinder assemblies are mounted to float with respect to said friction plates for equal pressure on the friction elements of each pair of friction elements.

20. Apparatus according to claim 17 wherein mercury is the seepage resistant hydraulic liquid.

* * * * *